US012265038B2

United States Patent
Hwang et al.

(10) Patent No.: US 12,265,038 B2
(45) Date of Patent: Apr. 1, 2025

(54) WAFER DEFECT DETECTION DEVICE

(71) Applicant: PlayNitride Display Co., Ltd., MiaoLi County (TW)

(72) Inventors: Yi-Chia Hwang, MiaoLi County (TW); Ching-Liang Lin, MiaoLi County (TW)

(73) Assignee: PlayNitride Display Co., Ltd., MiaoLi County (TW)

( * ) Notice: Subject to any disclaimer, the term of this patent is extended or adjusted under 35 U.S.C. 154(b) by 202 days.

(21) Appl. No.: 18/082,581

(22) Filed: Dec. 16, 2022

(65) Prior Publication Data

US 2024/0175827 A1    May 30, 2024

(30) Foreign Application Priority Data

Nov. 29, 2022 (TW) .................................. 111145541
Nov. 29, 2022 (TW) .................................. 111145542

(51) Int. Cl.
*G01N 21/95* (2006.01)

(52) U.S. Cl.
CPC . *G01N 21/9505* (2013.01); *G01N 2201/0636* (2013.01)

(58) Field of Classification Search
CPC ....... G01N 21/9505; G01N 2201/0636; G01N 21/8806; G01N 21/956; G01N 2021/95676; G01N 21/9501

(Continued)

(56) References Cited

U.S. PATENT DOCUMENTS

2013/0234591 A1* 9/2013 Hattori .................. H01L 33/504
                                                            313/498
2014/0096293 A1* 4/2014 Kitano .................. G11B 5/455
                                                            850/32

(Continued)

FOREIGN PATENT DOCUMENTS

CN        102788769      11/2012
CN        110308152      10/2019

(Continued)

OTHER PUBLICATIONS

"Office Action of Related U.S. Appl. No. 18/082,562", issued on Jul. 30, 2024, p. 1-p. 15.

(Continued)

*Primary Examiner* — Md M Rahman
(74) *Attorney, Agent, or Firm* — JCIPRNET

(57) ABSTRACT

A wafer defect detection device adapted for detecting a sample to be tested including two detection features is provided. The wafer defect detection device includes a stage adapted for holding the sample to be tested, a light source module configured to output a detection light to the sample to be tested and reflect a reflected light, and an image sensor disposed on a path of the reflected light and adapted for receiving an image frame. The detection light includes spectra of a first light and a second light, which have two different peak wavelengths. The spectrum of the first light is adapted for detecting one of the detection features. The spectrum of the second light is adapted for detecting other one of the detection features. Luminous intensities of the first light and the second light are independently controlled. The reflected light includes the image frame, which displays the detection features.

10 Claims, 4 Drawing Sheets

(58) Field of Classification Search
USPC .................................................... 356/237.5
See application file for complete search history.

(56) References Cited

U.S. PATENT DOCUMENTS

| | | |
|---|---|---|
| 2014/0146297 A1 | 5/2014 | Vainer et al. |
| 2018/0129308 A1* | 5/2018 | Lee ................. H04N 21/42222 |
| 2020/0088784 A1 | 3/2020 | Lei |
| 2021/0050271 A1* | 2/2021 | Lin ........................ H01L 22/22 |
| 2021/0239959 A1 | 8/2021 | Lim |
| 2022/0373480 A1 | 11/2022 | Nakamura et al. |

FOREIGN PATENT DOCUMENTS

| | | | |
|---|---|---|---|
| CN | 112229857 | | 1/2021 |
| CN | 112748111 | | 5/2021 |
| KR | 20140048831 | * | 4/2014 |
| TW | 200839227 | | 10/2008 |
| TW | 201428279 | | 7/2014 |
| TW | 202043746 | | 12/2020 |
| TW | 202240148 A | * | 10/2022 |

OTHER PUBLICATIONS

"Office Action of Taiwan Counterpart Application, Application No. 111145541", issued on Nov. 22, 2023, p. 1-p. 6.
"Office Action of Taiwan Counterpart Application, Application No. 11145542", issued on Nov. 22, 2023, p. 1-p. 7.

* cited by examiner

US 12,265,038 B2

WAFER DEFECT DETECTION DEVICE

CROSS-REFERENCE TO RELATED APPLICATION

This application claims the priority benefits of Taiwan application serial no. 111145541, filed on Nov. 29, 2022 and Taiwan application serial no. 111145542, filed on Nov. 29, 2022. The entirety of each of the above-mentioned patent applications is hereby incorporated by reference herein and made a part of this specification.

BACKGROUND

Technical Field

The disclosure relates to a wafer defect detection device, and particularly relates to a wafer defect detection device with a high detection efficiency.

Description of Related Art

Currently, it is quite common to determine whether a sample to be tested is good with automated optical inspection (AOI). Generally, multiple detection features on the sample to be tested needs to be checked if they meet the standards. If a detection light of the same waveband is always applied to the detection features of different positions or appearances, there may be a problem that contrasts of images of some detection features are not sufficient to identify defects. Based on the situation that the contrast of the detection features does not meet the detection requirement, a general practice is to respectively detect these detection features with detection lights of different wavebands, and then synthesize images for automatic optical inspection by post-production or individually inspect the images obtained during the detection.

However, either the post-production or individual inspection, extra manpower and time cost are consumed. In particular, for example, there are usually millions of features to be detected on a wafer since semiconductor packaging structures are gradually miniaturized nowadays. To overcome the problem of contrasts of images, the above methods will inevitably and greatly decrease the efficiency of automatic optical inspection. Therefore, it is a research direction in this field that how to accurately determine whether multiple detection features meet the standards through single detection.

SUMMARY

The disclosure provides a wafer defect detection device, which can obtain an image frame with detection features of a high contrast through one detection, so as to achieve a high detection efficiency.

The wafer defect detection device of the disclosure is adapted for detecting a sample to be tested, and the sample to be tested includes two detection features. The wafer defect detection device includes a stage, a light source module, and an image sensor. The stage is adapted for holding the sample to be tested. The light source module is configured to output a detection light to the sample to be tested on the stage and reflect a reflected light. The detection light includes a spectrum of a first light and a spectrum of a second light, and the first light and the second light have two different peak wavelengths. The spectrum of the first light is adapted for detecting one of the detection features, and the spectrum of the second light is adapted for detecting the other one of the detection features. A luminous intensity of the first light and a luminous intensity of the second light are independently controlled. The reflected light includes an image frame, and the image frame displays the two detection features. The image sensor is disposed on a path of the reflected light and is adapted for receiving the image frame.

Based on the above, the detection light output by the light source module of the wafer defect detection device of the disclosure includes the first light and the second light with two different peak wavelengths. The reflected light is reflected after the detection light is irradiated on the sample to be tested, since the reflected light also includes the spectrum of the first light and the second light, the wafer defect detection device of the disclosure is adapted for detecting the detection features by different spectrum. Therefore, the two detection features in the image frame of the reflected light are provided with high contrast so to be clear presented. In addition, the luminous intensity of the first light and the luminous intensity of the second light of the light source module are independently controlled, and the luminous intensities of the first light and the second light can be adjusted according to requirements to optimize the contrasts of a first detection feature and a second detection feature.

DESCRIPTION OF THE EMBODIMENTS

Figure 1:
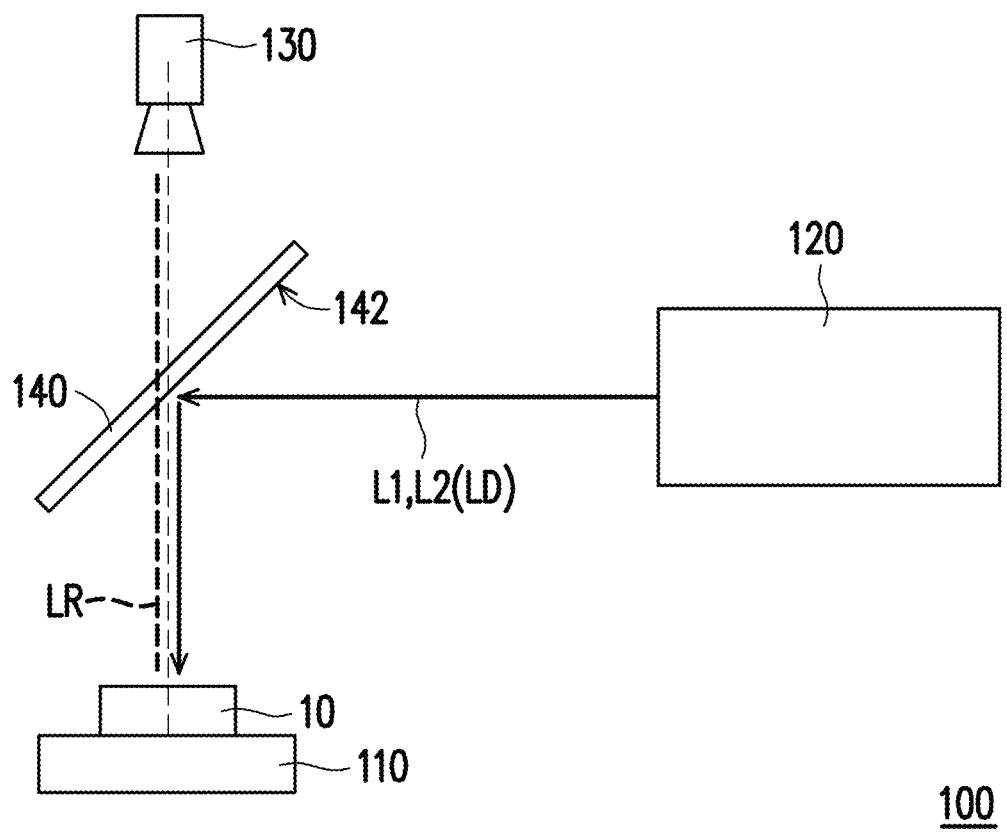
FIG. 1 is a schematic diagram of a wafer defect detection device according to an embodiment of the disclosure.

FIG. 1 is a schematic diagram of a wafer defect detection device according to an embodiment of the disclosure. Please refer to FIG. 1. A wafer defect detection device 100 of this embodiment is adapted for detecting a sample to be tested 10. The sample to be tested 10 is, for example, a part of a wafer, but is not limited thereto.

The wafer defect detection device 100 includes a stage 110, a light source module 120, and an image sensor 130. The stage 110 is adapted for holding the sample to be tested 10. The light source module 120 is configured to output a detection light LD.

In some embodiments, a spectrum of the detection light LD may include two of ultraviolet light waveband (wavelength range from about 100 nm to 380 nm), purple light waveband (wavelength range from about 380 nm to 450 nm), blue light waveband (wavelength range from about 450 nm to 495 nm), green light waveband (wavelength range from about 495 nm to 570 nm), yellow light waveband (wavelength range from about 570 nm to 590 nm), orange light waveband (wavelength range from about 590 nm to 620 nm), red light waveband (wavelength range from about 620 nm to 750 nm), and infrared light waveband (wavelength range from about 750 nm to 1 mm).

In this embodiment, the detection light LD includes a spectrum of a first light L1 and a spectrum of a second light L2. The spectrum of the first light L1 is, for example, a spectrum of red light (wavelength range from about 620 nm to 750 nm), and the spectrum of the second light L2 is, for example, a spectrum of green light (wavelength range from about 495 nm to 570 nm), but the spectrum of the first light L1 and the spectrum of the second light L2 are not limited thereto. The spectrum of the first light L1 may be selected as a spectrum adapted for detecting a first detection feature A (FIG. 3A) of the sample to be tested 10, and the spectrum of the second light L2 may be selected as a spectrum adapted for detecting a second detection feature B (FIG. 3A) of the sample to be tested 10.

The first light L1 and the second light L2 have two different peak wavelengths. A difference between the two peak wavelengths is greater than or equal to 50 nm, and a full width at half maximum (FWHM) of any one of the two peak wavelengths is less than 40 nm. Here, when the first detection feature A and the second detection feature B are detected by using lights with the same peak wavelength, if a contrast of one of the image frames is particularly low, it means that the spectrum of the light is not adapted for detecting the detection feature. That is to say, when the peak wavelength of the first light L1 and the peak wavelength of the second light L2 differ greatly, since the detection light LD has a wide spectrum coverage, the chance of capturing image frames of high contrast for different detection features is increased. In addition, sufficiently narrow FWHM of the first light L1 and the second light L2 are preferred, so as to reduce noise of wavebands with poor contrast with respect to the first detection feature A and the second detection feature B, thereby improving the quality of the image frames. The FWHMs of the first light L1 and the second light L2 may be different or the same.

Figure 2:
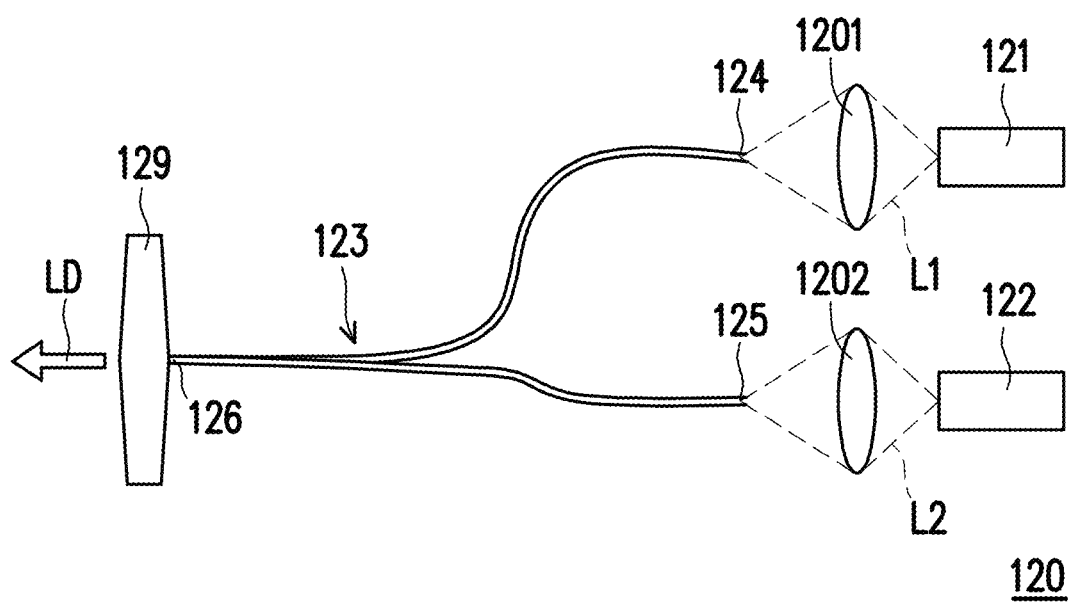
FIG. 2 is a schematic diagram of a light source module in FIG. 1.

FIG. 2 is a schematic diagram of a light source module in FIG. 1. Please refer to FIG. 2. In this embodiment, a light source module 120 includes a first light source 121 emitting the first light L1, a second light source 122 emitting the second light L2, and a light transmission member 123.

The light transmission member 123 is, for example, a combiner fiber or a light guide tube, but is not limited thereto. The light transmission member 123 includes a first inlet 124, a second inlet 125, and an outlet 126. The first light source 121 is coupled to the first inlet 124, and the second light source 122 is coupled to the second inlet 125.

Specifically, a coupling prism 1201 is disposed between the first light source 121 and the first inlet 124 of the light transmission member 123, so that the first light L1 emitted by the first light source 121 enters the first inlet 124. A coupling prism 1202 is disposed between the second light source 122 and the second inlet 125 of the light transmission member 123, so that the second light L2 emitted by the second light source 122 enters the second inlet 125.

The first light L1 and the second light L2 are mixed into the detection light LD in the light transmission member 123, and the outlet 126 of the light transmission member 123 outputs the detection light LD mixed with the first light L1 and the second light L2. That is to say, the detection light LD is a mixed light of the first light L1 and the second light L2.

In addition, since the first light source 121 and the second light source 122 of the light source module 120 are two independent light sources, luminous intensities can be independently controlled and adjusted. Therefore, the luminous intensity of the first light and the luminous intensity of the second light of the light source module can be independently controlled.

In addition, the light source module 120 further includes a light emission control mechanism 129 positioned next to the outlet 126 of the light transmission member 123 to control a light emission time of the detection light LD. The light emission control mechanism 129 is, for example, a shutter, which can control turning on or turning off and the time and frequency of turning on or turning off, so that the detection light LD can provide multiple functions such as flickering and black frame insertion.

Referring to FIG. 1, the wafer defect detection device 100 further includes a half lens 140. The half lens 140 includes a reflective surface 142 facing the stage 110 and the light source module 120. The reflective surface 142 reflects the detection light LD to the sample to be tested 10 on the stage 110 in order to change a direction of the detection light LD. The detection light LD is reflected by the sample to be tested 10 to form a reflected light LR. In some embodiments, the sample to be tested 10 may include multiple observation surfaces. The reflected light LR reflected by the sample to be tested 10 may include height information or appearance information (such as impurities, uneven film thicknesses, cracks, defects) of these observation surfaces.

The half lens 140 is positioned between the stage 110 and the image sensor 130, and the image sensor 130 is disposed on a path of the reflected light LR. Therefore, the reflected light LR passes through the half lens 140 to be incident on the image sensor 130. In this embodiment, the image sensor 130 may include, for example, a charge coupled device (CCD) or a complementary metal-oxide-semiconductor (CMOS), but the disclosure is not limited thereto. A field of view of the image sensor 130 is covered within an illumination range of the light source module 120.

In this embodiment, the detection light LD reflected by the reflective surface 142 and the reflected light LR reflected by the sample to be tested 10 are two parallel lights, and the detection light LD and the reflected light LR are coaxial. In addition, in this embodiment, the reflected light LR passing through the half lens 140 and the detection light LD emitted by the light source module 120 may include the same multiple light wavebands. That is, the half lens 140 has no waveband filtering function. In other words, the reflected light LR also includes light wavebands of the first light L1 and the second light L2.

Figure 3A:
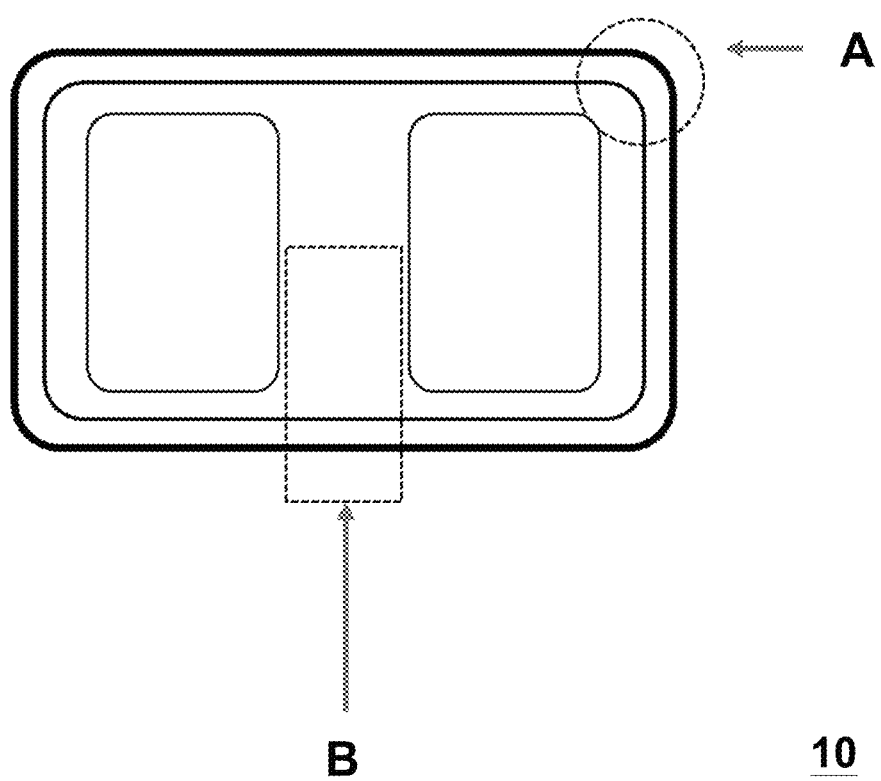
FIG. 3A is a schematic diagram of a sample to be tested.

FIG. 3A is a schematic diagram of a sample to be tested. Please refer to FIG. 3A. The sample to be tested 10 includes the first detection feature A and the second detection feature B. The first detection feature A is, for example, close to a corner of the sample to be tested 10, and the second detection feature B is, for example, close to a center of the sample to be tested 10.

Figure 3B:
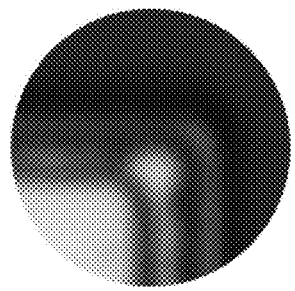
FIG. 3B is a microscopic image of a first detection feature of a sample to be tested detected by a first light.
Figure 3C:
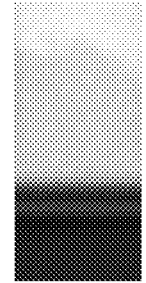
FIG. 3C is a microscopic image of a second detection feature of a sample to be tested detected by a first light.

FIG. 3B is a microscopic image of a first detection feature of a sample to be tested detected by a first light. FIG. 3C is a microscopic image of a second detection feature of a sample to be tested detected by a first light. Please refer to FIG. 3B and FIG. 3C. Each of the first detection feature A and the second detection feature B has a first native contrast under a detection by the first light L1.

Figure 3D:
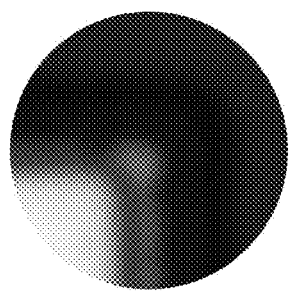
FIG. 3D is a microscopic image of a first detection feature of a sample to be tested detected by a second light.
Figure 3E:
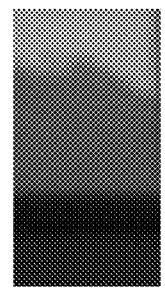
FIG. 3E is a microscopic image of a second detection feature of a sample to be tested detected by a second light.

FIG. 3D is a microscopic image of a first detection feature of a sample to be tested detected by a second light. FIG. 3E is a microscopic image of a second detection feature of a sample to be tested detected by a second light. Please refer to FIG. 3D and FIG. 3E. Each of the first detection feature A and the second detection feature B has a second native contrast under a detection by the second light L2.

Comparing FIG. 3B and FIG. 3D, it can be clearly seen that the first native contrast of the first detection feature A shown in FIG. 3B is greater than the second native contrast of the first detection feature A shown in FIG. 3D, that is, the detection feature A shown in FIG. 3B has a clearer appearance. Therefore, the first light L1 is more adapted for detecting the first detection feature A.

Next, comparing FIG. 3C and FIG. 3E, the second native contrast of the second detection feature B shown in FIG. 3E is greater than the first native contrast of the second detection feature B shown in FIG. 3C, that is, the detection feature B shown in FIG. 3E has a clearer appearance. Therefore, the second light L2 is more adapted for detecting the second detection feature B.

Figure 3F:
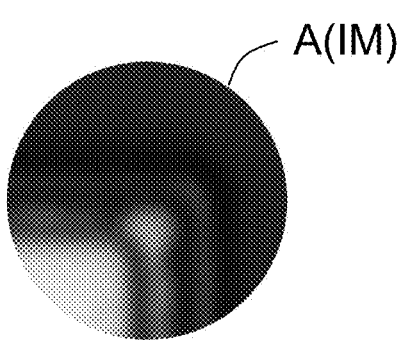
FIG. 3F is a microscopic image of a first detection feature of a sample to be tested detected by a reflected light.
Figure 3G:
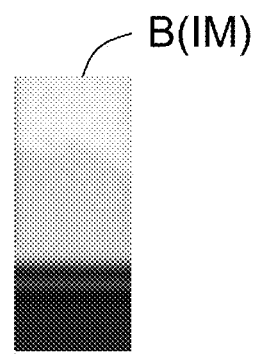
FIG. 3G is a microscopic image of a second detection feature of a sample to be tested detected by a reflected light.

FIG. 3F is a microscopic image of a first detection feature of a sample to be tested detected by a reflected light. FIG. 3G is a microscopic image of a second detection feature of a sample to be tested detected by a reflected light. Please refer to FIG. 3F and FIG. 3G. In an embodiment, in an image frame IM generated by the reflected light LR (FIG. 1), each of the first detection feature A and the second detection feature B has an output contrast under a detection by the reflected light LR. Also, the output contrast of FIG. 3F may be between the first native contrast of FIG. 3B and the second native contrast of FIG. 3D. In addition, the output contrast of FIG. 3G may be between the first native contrast of FIG. 3C and the second native contrast of FIG. 3E.

In summary, the detection light LD includes the spectra of the first light L1 adapted for detecting the first detection feature A and the second light L2 adapted for detecting the second detection feature B. and the spectrum of the reflected light LR received by the image sensor 130 is mixed from the first light L1 and the second light L2. Here, the contrasts of the reflected light LR in detecting the first detection feature A and the second detection feature B (i.e., FIG. 3F and FIG. 3G) are lower than the contrasts of FIG. 3B and FIG. 3E respectively, but higher than the contrasts of FIG. 3D and FIG. 3C respectively. Compared with a conventional detection manner, in which replacing light sources of different wavelengths to detect samples to be tested respectively is necessary so as to obtain multiple image frames formed by lights (such as a first light and a second light) of different wavebands, the wafer defect detection device 100 of this embodiment mixes the lights for detection according to the detection spectrum adapted for detecting each detection feature. In this way, the wafer defect detection device 100 of this embodiment can obtain sufficiently clear image frames of the first detection feature A and the second detection feature B by using one detection, thereby effectively improving the detection efficiency. Of course, the detection feature of the sample to be tested 10 and the number of light wavebands and the spectrum output by the light source module 120 are not limited thereto.

Figure 4:
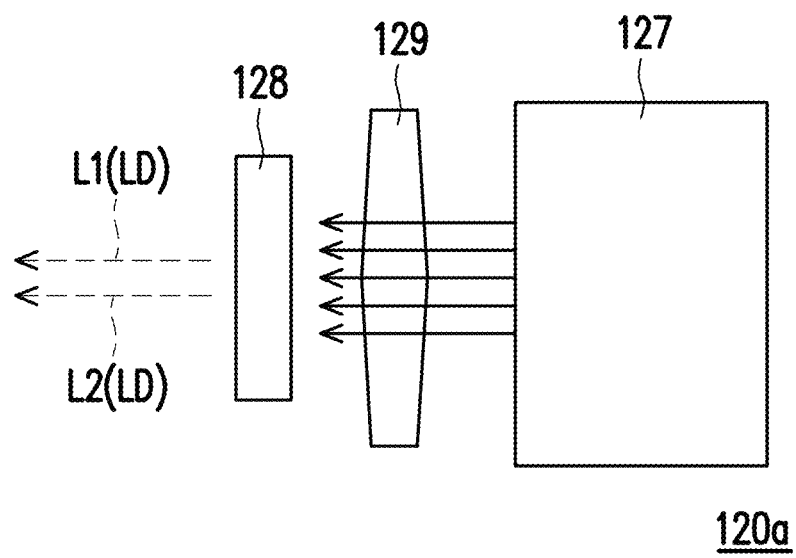
FIG. 4 is a schematic diagram of a light source module according to another embodiment of the disclosure.

In addition, the wafer defect detection device 100 in FIG. 1 may also use other light source modules. FIG. 4 is a schematic diagram of a light source module according to another embodiment of the disclosure. Please refer to FIG. 4. A light source module 120a includes a continuous spectrum light source 127 and at least one optical filter 128. A multi-waveband light emitted by the continuous spectrum light source 127 passes through the optical filter 128 to output the detection light LD.

The main difference between the light source module 120a of this embodiment and the light source module 120 of the previous embodiment is that the light source module 120 of the previous embodiment directly combines two or more wavelength-regulated light sources to form the detection light, while the light source module 120a of this embodiment filters a source of the detection light (the continuous spectrum light source) to retain more than two lights with different peak wavelengths.

In some embodiments, the continuous spectrum light source 127 may include, for example, xenon lamps, mercury lamps, or tungsten lamps with multiple light wavebands. In some embodiments, the continuous spectrum light source 127 may include a light-emitting diode chip and a wavelength conversion material, and the wavelength conversion material is disposed on the light-emitting diode chip to provide the multi-waveband light. The light-emitting diode chip may be a blue light-emitting diode chip, and the wavelength conversion material may be a green fluorescent-powder layer, a yellow fluorescent-powder layer, or a red fluorescent-powder layer, but the disclosure is not limited thereto.

In this embodiment, the optical filter 128 has more than two transmission spectra. The transmission spectra of the optical filter 128 correspond to the two peak wavelengths of the first light L1 and the second light L2. The optical filter 128 may include, for example, color filters, optical bandpass filters, infrared (IR) cut filters. IR pass filters, or/and ultraviolet (UV) filters. The optical filter 128 may filter the first light L1 and the second light L2, and filter out other unnecessary spectrum segments.

In this embodiment, the optical filter 128 is, for example, a filter mixed with various materials. These materials have different light transmittance for different wavebands. By adjusting a proportion of these materials (or changing the materials used), the ratio of the light that may pass through corresponding to each waveband can be combined. For example, if it is desired that an intensity of a red light is higher than an intensity of a green light after passing through the optical filter 128, a material with higher transmittance for the red light and lower transmittance for the green light may be selected, or the content of the material in the optical filter 128 may be increased.

Figure 5:
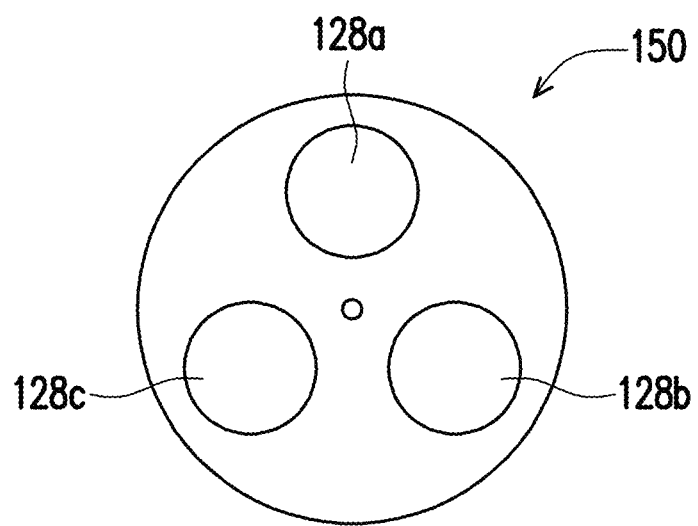
FIG. 5 is a schematic diagram of a switching mechanism and an optical filter according to an embodiment of the disclosure.

In order to conveniently adjust the luminous intensities of the first light L1 and the second light L2, multiple filters with different material proportions may be prepared in advance and switched when needed. For example, FIG. 5 is a schematic diagram of a switching mechanism and an optical filter according to an embodiment of the disclosure. Please refer to FIG. 5. A switching mechanism 150 of this embodiment may be disposed between the continuous spectrum light source 127 (FIG. 4) and the sample to be tested 10 (FIG. 1), and the switching mechanism 150 is, for example, a wheel component corresponding to the light outlet of the continuous spectrum light source 127, but is not limited thereto. Multiple optical filters 128a. 128b, and 128c are switchably disposed on the switching mechanism, so that one of the optical filters 128a. 128b, and 128c corresponds to the light outlet of the continuous spectrum light source 127 (FIG. 4) in a rotating manner, so as to achieve independent control of the first light L1 and the second light L2.

Please return to FIG. 4. In this embodiment, the light emission control mechanism 129 is optionally positioned beside the optical filter 128 to control the light emission time of the detection light LD. The light emission control mechanism 129 is, for example, positioned between the continuous spectrum light source 127 and the optical filter 128, but in other embodiments, the optical filter 128 may also be positioned between the continuous spectrum light source 127 and the light emission control mechanism 129. The light emission control mechanism 129 is, for example, a shutter, which can control turning on or turning off and the time and frequency of turning on or turning off, so that the detection light LD can provide multiple functions such as flickering and black frame insertion.

In summary, the detection light output by the light source module of the wafer defect detection device of the disclosure includes the first light and the second light with the two different peak wavelengths. Since the spectrum of the reflected light is mixed from the first light and the second light, the wafer defect detection device of the disclosure can use the reflected light to obtain the image frames of the first detection feature and the second detection feature with good contrasts at the same time, thereby enabling the defect appearances of these detection features to be clearly presented. In addition, the luminous intensity of the first light of the light source module and the luminous intensity of the second light of the light source module are independently controlled, and the luminous intensities of the first light and the second light can be adjusted according to requirements to optimize the contrasts of the first detection feature and the second detection feature.

What is claimed is:

1. A wafer defect detection device, adapted for detecting a sample to be tested, wherein the sample to be tested comprises two detection features, the wafer defect detection device comprising:
   a stage, adapted for holding the sample to be tested;
   a light source module, configured to output a detection light to the sample to be tested on the stage and reflect a reflected light, wherein the detection light comprises a spectrum of a first light and a spectrum of a second light, the first light and the second light have two different peak wavelengths, the spectrum of the first light is adapted for detecting one of the two detection features, the spectrum of the second light is adapted for detecting other one of the two detection features, a luminous intensity of the first light and a luminous intensity of the second light are independently controlled, the reflected light comprises an image frame, and the image frame displays the two detection features; and
   an image sensor, disposed on a path of the reflected light and adapted for receiving the image frame.

2. The wafer defect detection device according to claim 1, further comprising a half lens positioned between the stage and the image sensor, wherein the half lens comprises a reflective surface facing the stage and the light source module, the reflective surface reflects the detection light to the sample to be tested on the stage, and the reflected light passes through the half lens to be incident on the image sensor.

3. The wafer defect detection device according to claim 1, wherein a difference between the two peak wavelengths is greater than or equal to 50 nm.

4. The wafer defect detection device according to claim 1, wherein a full width at half maximum (FWHM) of any one of the two peak wavelengths is less than 40 nm.

5. The wafer defect detection device according to claim 1, wherein the light source module comprises a first light source emitting the first light, a second light source emitting the second light, and a light transmission member coupled to the first light source and the second light source.

6. The wafer defect detection device according to claim 5, wherein the light source module further comprises a light emission control mechanism positioned next to the light transmission member to control a light emission time of the detection light.

7. The wafer defect detection device according to claim 1, wherein the light source module comprises a continuous spectrum light source and at least one optical filter, a multi-waveband light emitted by the continuous spectrum light source passes through the at least one optical filter to output the detection light, and a transmission spectrum of the at least one optical filter corresponds to the two peak wavelengths of the first light and the second light.

8. The wafer defect detection device according to claim 7, wherein the at least one optical filter is a plurality of optical filters, and at least one of the first light and the second light has different transmittance with respect to any two of the optical filters.

9. The wafer defect detection device according to claim 8, further comprising a switching mechanism disposed between the continuous spectrum light source and the sample to be tested, wherein the optical filters are switchably disposed on the switching mechanism.

10. The wafer defect detection device according to claim 1, wherein in the image frame, each of the two detection features has an output contrast under a detection of the reflected light, each of the two detection features has a first native contrast under a detection of the first light, each of the two detection features has a second native contrast under a detection of the second light, and each of the output contrasts is between the first native contrast and the second native contrast of the detection feature.

* * * * *